United States Patent [19]

Tchang et al.

[11] 4,384,559
[45] May 24, 1983

[54] SPEED LIMITING DEVICE FOR VEHICLE DRIVEN BY INTERNAL COMBUSTION ENGINE

[75] Inventors: Takiang Tchang, Garches; Christian Guicherd, Le Pecq, both of France

[73] Assignee: Regie Nationale des Usines Renault, Boulogne-Billancourt, France

[21] Appl. No.: 270,566

[22] Filed: Jun. 4, 1981

[30] Foreign Application Priority Data

Jun. 5, 1980 [FR] France ............................. 80 12509

[51] Int. Cl.$^3$ ............................................. F02D 31/00
[52] U.S. Cl. .................................. 123/332; 123/336; 123/401; 261/41 C
[58] Field of Search ............... 123/336, 342, 401, 319, 123/332; 261/23 A, 41 C, DIG. 18

[56] References Cited

U.S. PATENT DOCUMENTS

| | | | |
|---|---|---|---|
| 2,609,806 | 9/1952 | Winkler | 261/41 C |
| 3,259,376 | 7/1966 | Baer | 261/23 A |
| 3,811,418 | 5/1974 | Sakakibara | 123/336 X |
| 4,053,542 | 10/1977 | Niebrzydoski | 261/41 C |
| 4,199,039 | 4/1980 | Ciemochowski | 123/360 X |

*Primary Examiner*—William A. Cuchlinski, Jr.

*Attorney, Agent, or Firm*—Oblon, Fisher, Spivak, McClelland & Maier

[57] ABSTRACT

The invention relates to a speed limiting device for a vehicle driven by an internal combustion engine provided with a twin-body carburettor or a dual fuel injection unit comprising two throttle butterfly valves controlled by the vehicle's accelerator pedal through an operating mechanism, a flexible connection mechanism combined with at least one of the said throttle valves and a depression valve calibrated at a given depression value corresponding to a vehicle speed not to be exceeded and designed to operate, above the said given speed, in the direction of closure, at least one of the said throttle valves combined with the said flexible connection means.

The flexible connection means (3–7, 15) is placed between the said throttle valves ($P_1$, $P_2$), one of which ($P_1$) is controlled by the movements of the accelerator pedal, and comprises a spring (6) of the right stiffness to lock the said throttle valves ($P_1$, $P_2$) in rotation in the opening direction below the said given speed and to yield and allow the other throttle valve ($P_2$) to be closed by the depression valve (8, 8a, 8b, 8c) above the said given speed.

7 Claims, 6 Drawing Figures

SPEED LIMITING DEVICE FOR VEHICLE DRIVEN BY INTERNAL COMBUSTION ENGINE

The present invention relates to a speed limiting device for vehicle driven by an internal combustion engine, particularly with a controlled ignition system, either with a carburettor or with a fuel injection system. This device is more specifically designed to limit the maximum speed of a vehicle whilst still providing the engine with full power during acceleration phases.

In order to obtain maximum power under full load and fuel savings under low load, a known method is to use a twin-body (double-barrel) carburettor (or a dual throttle unit for fuel (gasoline) injection engines) in which the first throttle is controlled directly by the accelerator pedal whilst the second throttle only opens beyond a certain load. In a classic embodiment the opening of the second throttle valve is controlled by a rotary joint between the valve levers.

Furthermore, notably due to U.S. Pat. No. 4,199,039, a twin-body carburettor is known comprising two throttle valves fixed in rotation to a common spindle controlled by the accelerator pedal. This carburettor is fitted with a speed limiting device comprising a flexible connection mechanism, combined with the said spindle shared by the throttle butterfly valves, and a depression valve calibrated at a given depression value corresponding to a vehicle speed that must not be exceeded and designed to operate the throttle valves so that they close above this given speed. However, in this type of carburettor both throttles are open or closed at the same time so that it does not enable the requirement of fuel economy under low load to be satisfied.

The invention aims to achieve a speed limiting device with a calibrated depression valve which can be used with a dual throttle carburettor or unit conforming to the above-mentioned classic embodiment with a rotary joint between the two throttle valve levers with modification of the kinematics of the two throttles above the speed limit.

To this end the object of the invention is a speed limiting device for a vehicle driven by an internal combustion engine provided with a twin-body carburettor or a dual injection unit comprising two throttle butterfly valves controlled by the vehicle's accelerator pedal by means of an actuating mechanism, a flexible connection mechanism combined with at least one of the said throttle valves and a depression valve calibrated at a given depression value corresponding to a vehicle speed not to be exceeded and designed to operate in the closing direction at least one of the said throttle valves combined with the said elastic or flexible connection mechanism above the said given speed, characterized in that the said flexible connection mechanism is placed between the said throttle valves, one of which is controlled by the movements of the accelerator pedal, and comprises a spring of suitable stiffness to fix the said throttle valves together in rotation in the opening direction below the said given speed and to yield and allow the other throttle valve to be closed by the depression valve above the said given speed.

Other features and advantages of the invention will be revealed on reading the following description of two embodiments of the speed limiting device which are not restrictive, referred to the appended drawing in which.

Figure 1:
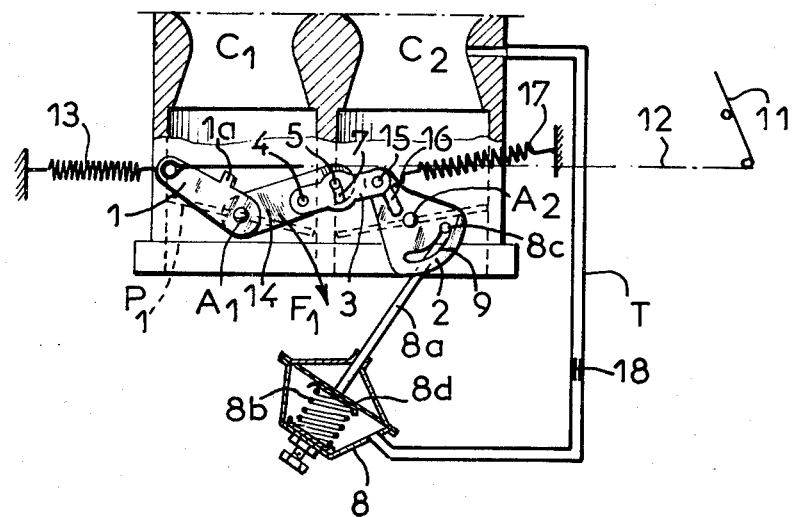
FIG. 1 is a partially cut away schematic view of a first embodiment of the speed limiting device according to the invention, applied to a twin-body carburettor shown with the two throttle valves in the closed position.
Figure 2:
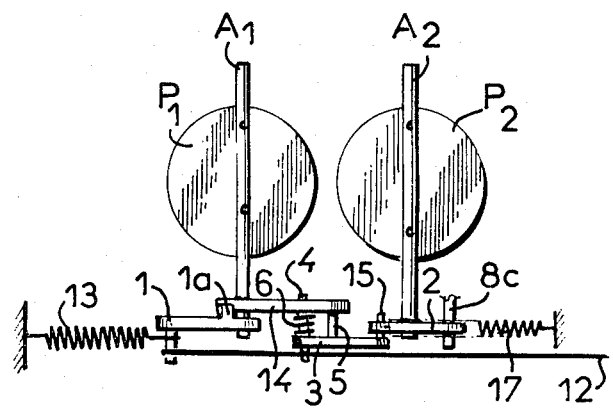
FIG. 2 is a part schematic plan view of the speed limiting device in FIG. 1.

Referring to FIGS. 1 and 2, the twin-body $C_1$, $C_2$ carburettor shown comprises two throttle valves $P_1$ and $P_2$ respectively controlled for opening and closing by spindles $A_1$ and $A_2$ fixed respectively to levers 1 and 2.

Lever 1 is connected to the accelerator pedal 11 by a cable 12 and is held in the closed position of throttle valve $P_1$ by a spring 13. Lever 1 has a stop 1a designed to engage against a lever 14 fitted to rotate on spindle $A_1$.

A link 3 is pivoted on lever 14 round a pin 4. This link has a hole 7 into which projects a drive finger 5 fixed to lever 14. A spiral spring 6 fitted between lever 14 and link 3 pushes this latter in rotation round pin 4 in the direction of arrow $F_1$; the normal position of the link 3 with respect to the lever 14 shown in FIG. 1 is defined determined by the bearing of finger 5 against the upper edge of the hole 7.

The link 3 has, at the opposite end to the pin 4, a finger 15 engaging in a hole 16 in lever 2. Lever 2 is forced towards the closed position of throttle $P_2$ by a spring 17. The stiffness of spring 6 is such that the torque it applies is greater than the return torque applied to lever 2 by spring 17. Thus, when the stop 1a of lever 1 bears against lever 14, continuation of the latter's rotary movement in the direction of arrow $F_1$ causes lever 2 to rotate in the opposite direction round its spindle $A_2$ since link 3 is locked with lever 14 owing to spring 6.

A depression valve 8 comprises a diaphragm 8d subjected on one side to atmospheric pressure and on the other to the depression or suction pressure obtaining in the venturi throat of body $C_2$ through a pipe T in which a choke or restrictor has been inserted. In another version valve 8 may be connected to the venturi throat of body $C_1$ or to both venturi throats of bodies $C_1$ and $C_2$. This depression valve 8 is installed so that the bent end 8c of its rod 8a engages with a hole 9 made in lever 2 of the second throttle valve $P_2$. Spring 8b of valve 8 is calibrated to the suction pressure obtaining at the level of the venturi throat of body $C_2$ at the given speed to which it is required to limit the vehicle, so that valve 8 is only operated when this given speed has been reached.

Figure 3:
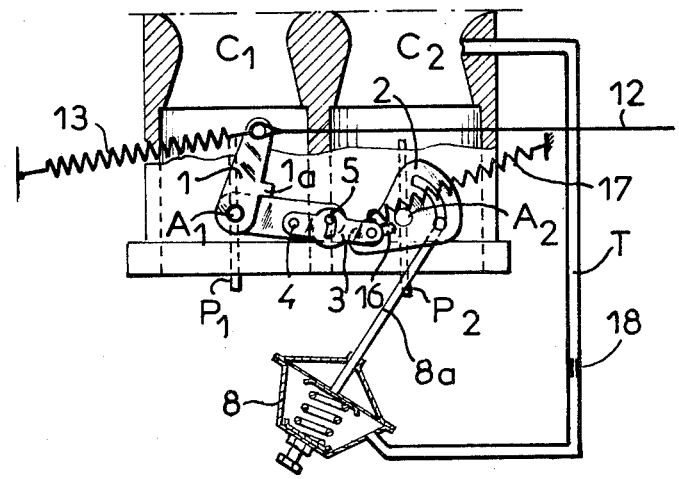
FIG. 3 is a similar view to FIG. 1 showing the carburettor with the throttle valves in the completely open position.

In the released position of the accelerator pedal 11 shown in FIG. 1, throttles $P_1$ and $P_2$ are held closed by springs 13 and 17 respectively. When acceleration is begun cable 12 turns lever 1 in the direction of arrow $F_1$, thus gradually opening throttle $P_1$. On its own side throttle $P_2$ stays closed until stop 1a on lever 1 bears against lever 14, permitting fuel economy operation of the vehicle up to that point. From this instant on, if the pedal continues to be pressed, the stop 1a on lever 1 pushes lever 14 which in turn moves lever 2 through link 3 fixed to lever 14 as previously indicated. This movement can continue up to the full opening position of throttle valves $P_1$ and $P_2$ shown in FIG. 3.

Figure 4:
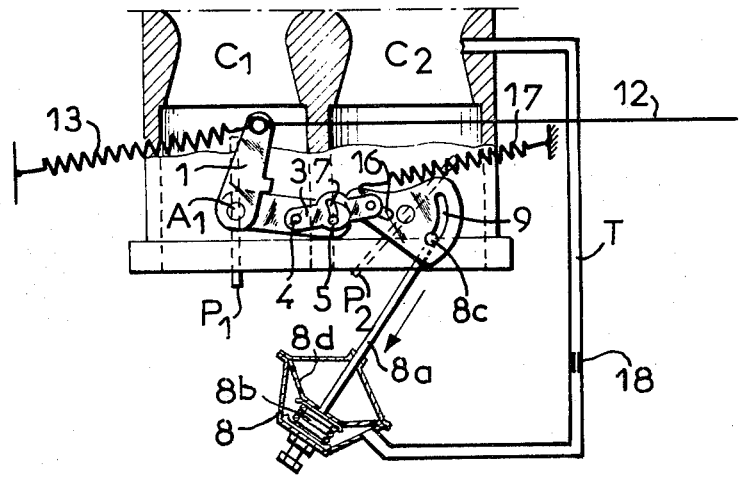
FIG. 4 is a view similar to FIG. 3 showing the carburettor in the position in which one of the throttle valves is partly closed by the limiting device because the speed limit is being exceeded.

When the vehicle reaches the given speed limit not to be exceeded valve 8, actuated by the depression, draws back rod 8a the end 8c of which then bears against the bottom edge of hole 9 owing to the previous rotation of lever 2, and rotates the latter in the direction of closure of throttle valve $P_2$. During this movement lever 2 pushes back finger 15 and makes link 3 rotate about its pin 4 and compress spring 6. This movement continues, without altering the position of throttle valve $P_1$ held wide open by the accelerator pedal 11, until the bottom edge of hole 7 in link 3 bears against finger 5 of lever 14, at that time held by stop 1a. Throttle $P_2$ then takes up the partially closed position in FIG. 4 and limits the vehicle speed even if throttle $P_1$ is held wide open by the accelerator pedal 11. In another version the length of hole 7 and the travel of rod 8a can be chosen to be long enough to provide complete closure of throttle $P_2$.

When a sudden acceleration is performed by pressing the accelerator pedal hard down while the vehicle is travelling at a speed below the speed limit that must not be exceeded, the two throttles $P_1$, $P_2$ open completely since link 3 and lever 1, held together by finger 5 and the force of spring 6, act like a single lever, which is translated into full engine power. If, during this acceleration, the vehicle reaches the speed limit, throttle $P_2$ does not close at once since the choke 18 delays the application to valve 8 of the depression obtaining in the venturi throat of body $C_2$. This therefore makes it possible to temporarily exceed the speed limit and to provide for overtaking other vehicles in complete safety. For this reason, and although it is not essential, it is preferable for the choke 18 to be present.

Figure 5:
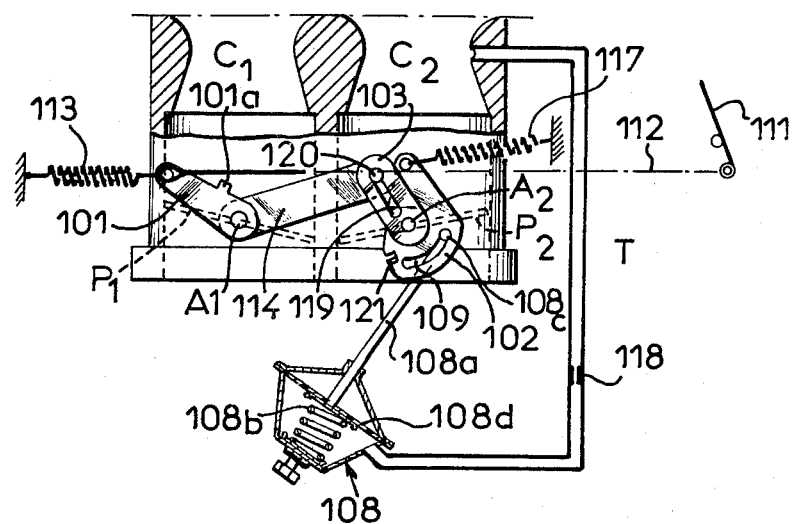
FIG. 5 is a similar view to FIG. 1 of a second embodiment of the speed limiting device according to the invention.
Figure 6:
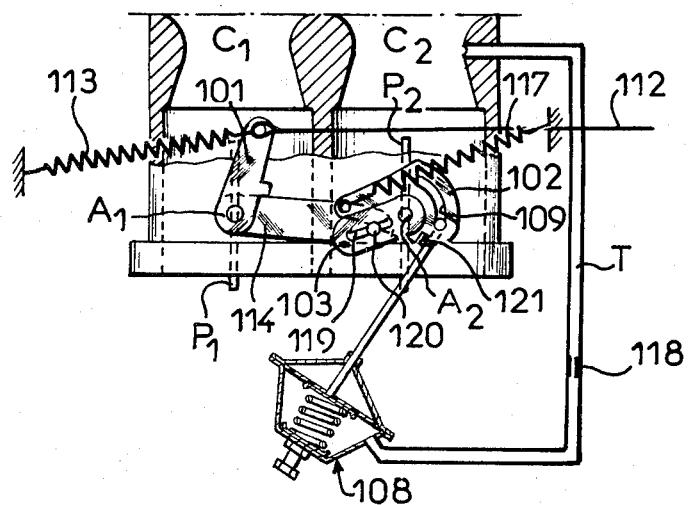
FIG. 6 is a similar view to FIG. 3 showing the speed limiting device of FIG. 5 in the position with the throttle valves completely open.

We shall now refer to FIGS. 5 and 6 which show a speed limiting device according to a second embodiment of the invention and in which the same reference numbers as in FIGS. 1 to 4, but with the number 100 added on, have been used to designate the same parts.

According to this variant link 103 is pivoted on lever 102 round spindle $A_2$ instead of on lever 114. Holes 7 and 16 are eliminated and replaced by a hole 119 made in link 103 in which a finger 120 engages, this finger being fixed to lever 114. Lever 102 and link 103 are fixed together when the throttles open by a spring (not shown) playing a similar part to spring 6 in the first embodiment version and designed to be compressed on closure of the second throttle $P_2$ by the depression valve 108. Finally, the lever 102 comprises a stop 121 which works with link 103 to limit the range of closure of throttle $P_2$ by the depression valve 108.

The speed limiter of FIGS. 5 and 6 works in the same way as the limiter of FIGS. 1 to 4, so its description will not be repeated. It will simply be noted that, when the depression valve 108 is actuated by the low pressure obtaining in the venturi throat of body $C_2$, the closure movement of throttle $P_2$ is limited by stop 121 coming up against link 103.

It is obvious that this invention is in no way limited to the embodiment described above, but that it embraces all the modifications and variants within the capacity of a specialist, founded on the same basic principle. Thus, in particular, insofar as fuel injection engines are concerned, the same device can be applied to dual throttle units. Furthermore it will also be noted that the speed limiting device according to the invention could be applied to engines with twin-body carburettors or with dual throttle injection units in which both throttles are operated not with a relative delay in opening with respect to each other but simultaneously.

We claim:

1. A speed limiting device for an internal combustion engine of a vehicle, said engine including an air-fuel supply device including two barrels each of which is provided with a throttle valve, said speed limiting device comprising:

accelerator pedal linkage connected to a first said throttle valve for controlling movement of said first throttle valve;

a flexible connection mechanism associated with one of said throttle valves and connected to the other of said throttle valves, said flexible connection mechanism including flexible spring means, for moving said second throttle valve from a closed position to an open position in response to selected movements of said first throttle valve; and a depression valve operable in response to the engine vacuum in a portion of said air-fuel supply device and connected to said flexible connection mechanism, said depression valve being constructed so as to overcome said flexible spring means in response to said engine vacuum, whereby engine vacuum in said portion of said air-fuel supply device corresponding to a predetermined vehicle speed will operate said depression valve to overcome said flexible spring means so as to move said second throttle valve in the direction of said closed position.

2. The device according to claim 8 wherein the said accelerator pedal linkage comprises a first lever fixed to the first throttle valve and wherein said flexible connection mechanism comprises a second lever fixed to the second throttle valve and a third lever engaging with said first lever to selectively rotate said second lever and said second throttle valve with a delay in opening compared with the first throttle, wherein said flexible connecting mechanism further comprises a link pivoted on the third lever and having a finger engaging with a hole in the second lever, said flexible spring means being placed between the third lever and the link.

3. Device according to claim 2, wherein said link has a hole in which a finger of the third lever engages.

4. The device according to claim 1 wherein said operating mechanism comprises a first lever fixed to the first throttle valve, and wherein said flexible connection mechanism comprises a second lever fixed to the second throttle valve, and a third lever engaging with said first lever to selectively rotate said second lever and said second throttle valve with a delay in opening with respect to the first throttle valve wherein said flexible connection mechanism further comprises a link pivoted on the second lever and having a hole in which a finger fixed to the third lever engages, said flexible spring means being placed between the second lever and the link.

5. The device according to claim 4 wherein said second lever comprises a stop engaging with the link to limit the range of closure of the second throttle valve by the depression valve.

6. The device according to claims 2 or 3 or 4 or 5 or 1 wherein said depression valve comprises an operating rod one end of which is engaged in another hole made in the second lever.

7. The device of claims 2 or 3 or 4 or 5 or 1 including an air flow restriction connected between said portion of said air-fuel supply device and said depression valve whereby the operation of said depression valve is delayed.

* * * * *